Patented Oct. 31, 1933

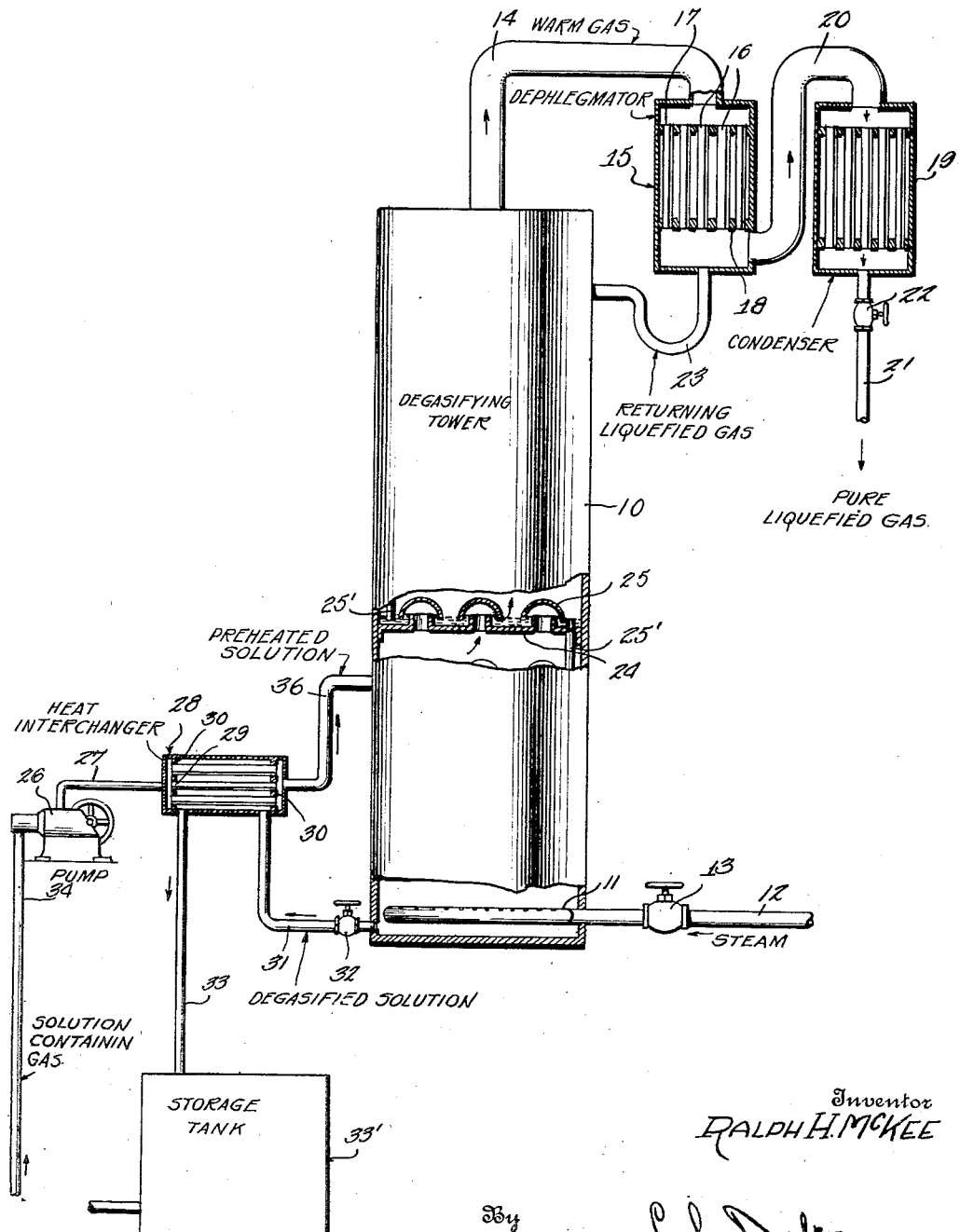

1,932,903

UNITED STATES PATENT OFFICE 1,932,903

PROCESS OF AND APPARATUS FOR LIQUEFYING GASES

Ralph H. McKee, Jersey City, N. J.

Application November 17, 1927
Serial No. 233,932

17 Claims. (Cl. 23—178)

This invention relates to a process of liquefying gases which is materially less expensive than gas-liquefying processes heretofore known.

An important object of my invention is to provide a process of the above mentioned character in which drying agents, such as sulfuric acid, calcium chlorid or the like, need not be used for drying the gases before liquefying them.

Another object is to provide a process in which the power and steam required to carry out the process are materially less than are needed in methods heretofore known.

A further object is to provide a process in which gases are dried by contacting them with liquefied gas before cooling the gas to liquefy it.

Other objects and advantages of my invention will become apparent from the following description.

In the accompanying drawing I have shown apparatus particularly adapted for use in carrying out my process. In this showing, The figure represents an elevational view of the apparatus, parts being shown in section and parts being broken away.

In prior methods of making liquefied gas such, for example, as sulfur dioxid, it has been customary to dissolve the sulfur dioxid in a water solution and then heat the water solution to boil off the gas. The resulting sulfur dioxid produced by boiling off from a water solution is wet, and it is generally dried by passing the gas counter-currentwise to a stream of strong sulfuric acid in order to remove the water, after which the dried gas is compressed and cooled in order to liquefy it.

In the preferred practice of my process I dissolve the gas which it is desired to liquefy in a solvent thereof, preferably an aqueous salt solution, but a nonaqueous solution may be used, and then heat the solution, preferably under pressure, to drive off the gas. A part of the gas so produced is condensed to liquefy it, and is used to dry the gas which is expelled from the solution having the gas dissolved therein. The remaining portion of the gas is then condensed and is then led into storage tanks or shipping vessels.

Referring to the accompanying drawing, the numeral 10 designates a plate and cap column tower having a perforated steam coil 11 arranged therein adjacent the bottom thereof. A closed steam coil (not shown) may also be arranged within the tower 10. Steam may be admitted through a pipe 12 from any desired source and the amount of steam so admitted to either coil may be controlled as by the valve 13. An outlet pipe 14 is connected at one end with the top of the plate and cap column tower 10 and its other end with a dephlegmator or partial condenser designated generally by the numeral 15. The dephlegmator 15 is provided with pipes or tubes 16 mounted at their ends in headers 17 and 18 in accordance with the conventional tube boiler construction. Cooling liquid is circulated through the inner compartment between the headers 17 and 18 through suitable connections (not shown). A similar condenser 19 is connected with the dephlegmator 15 by means of a pipe 20. A pipe 21 provided with a control valve 22 is adapted to deliver the liquefied gas discharged from the condenser 19 into suitable storage tanks or shipping containers. A pipe or inverted siphon trap 23 is connected at one end with the bottom of the dephlegmator 15 and at its opposite end with the tower 10 adjacent the top thereof. The tower 10 is provided with a plurality of trays or plates 24 adapted to contain liquefied gas, the plates 24 having caps 25 arranged thereabove, and down pipes 25' to direct liquefied gas flowing from an upper to a lower plate into the next lower plate. Arranged adjacent the tower 10 is a liquid pump 26 having a pipe 27 connected thereto at one of its ends and at the other a supply pipe 34 and the opposite end of the pipe 27 is connected with a heat interchanger designated generally by the numeral 28. The heat interchanger 28 is of conventional construction and is provided with a plurality of tubes or pipes 29 mounted at their ends in headers 30. These headers form an inner compartment into which the hot, degasified solution from the bottom of the tower 10 is admitted by means of a pipe 31. The flow of the hot, degasified solution from the tower 10 is regulated by means of a control valve 32. A pipe 33 is connected at one of its ends with the compartment between the headers 30 of the heat interchanger 28 and at its opposite end to a storage tank 33'. A pipe 34 connects the pump 26 with the supply tank (not shown) of solution containing gas. The heat interchanger 28 is connected with the tower 10 by the pipe 36, as shown, the pipe 36 communicating with the tower 10 at a point spaced from the bottom thereof, and preferably at about the sixth plate from the bottom of a twenty plate tower. Thermometers, vent valves, pressure gauges, and similar accessories, though used are not shown on the drawing.

In practicing my process it is advantageous to select a solvent which will dissolve large quantities of the gas which it is desired to liquefy.

In liquefying sulfur dioxid and certain other gases such, for example, as acetylene, an approximately saturated sodium cymene sulfonate solution is found to dissolve more gas than can be dissolved in an equal amount of water at the same temperature. An approximately saturated solution of potassium sulfo-cyanide is an excellent solvent for sulfur dioxid and will dissolve between seven and eight times as much sulfur dioxid as will water at the same temperature. In liquefying sulfur dioxid, for example, the gas is dissolved in the cold solvent, preferably an approximately saturated solution of potassium sulfo-cyanide, and this solution is pumped by means of the pump 26 through pipe 27 into the heat interchanger 28 from the opposite end of which the thereby heated solution flows into the plate and cap column tower 10 through pipe 36. The salt solution admitted into the tower 10 is further heated by means of a closed steam coil (not shown) or by means of the perforated steam coil 11 by steam admitted through pipe 12. The sulfur dioxid gas is expelled from the salt solution and is discharged from the tower 10 through the pipe 14 into the dephlegmator 15 where it is partially condensed and liquefied. The liquefied gas so produced is returned to the top of the tower 10 through pipe 23, and the remaining portion of the gas is discharged through the pipe 20 into the condenser 19 where it is condensed. From the condenser 19 the liquefied gas is discharged through the pipe 21 and is conducted into suitable storage tanks or shipping vessels. The gas which is driven off from the salt solution when the solution is heated in the tower 10 flows upwardly through the plates 24 in the column 10 and is dried by contact with liquefied sulfur dioxid admitted to the top plates of the tower through pipe 23. The hot degasified salt solution flows from the bottom of the tower 10 through the pipe 31 into the inner compartment of the heat interchanger 28 surrounding the tubes 29 where such hot salt solution transfers the major portion of its heat to the cold salt solution having the gas to be liquefied dissolved therein. This transfer of heat decreases the amount of steam that need be admitted into the steam coils in order to raise the temperature of the salt solution to a temperature at which such solution will give off its dissolved gas. The salt solution is preferably pumped into the tower 10 under pressure and I have found that a pressure of about 60 pounds per square inch produces very satisfactory results when working with sulfur dioxid. The control valve 22 adjacent the outlet of the condenser 19, and the valve 32 adjacent the outlet of the tower 10 are regulated to maintain a pressure of about 60 pounds per square inch within the whole of the liquefying apparatus. The exact pressure maintained within the liquefying apparatus depends upon the method of operation employed, the gas to be liquefied, and the temperature of the cooling liquid in the dephlegmator 15 and condenser 19. For example, if water of ordinary temperature is used in the dephlegmator and condenser, a pressure of 60 pounds per square inch will be found to be sufficient to liquefy sulfur dioxid. If the temperature of the cooling liquid be higher, it is necessary to increase the pressure in the liquefying system in order to liquefy the gases. It will be obvious that if the temperature of the cooling liquid employed in dephlegmator 15 and condenser 19 is low enough, the gas will be liquefied if the pressure in the liquefying system is equal to or less than atmospheric pressure. However, for practical reasons I prefer to maintain a substantial pressure within the liquefying system. Similarly the proportion of the liquefied gas which is returned to the tower 10 depends upon the number of plates in the column. The greater the number of plates in the tower, the smaller the proportion of liquefied gas that needs to be condensed by the dephlegmator 15 and returned to the column. Instead of a plate and cap tower a tower filled with tower filling may be used.

The above described method of liquefying gases is attended with numerous practical advantages over liquefying processes heretofore employed among which advantages may be mentioned: First: In my process no drying step such as treatment with sulfuric acid in the case where sulfur dioxid is being liquefied, or calcium chlorid when carbon dioxid is being liquefied, is required. Second: The steam requred in my process both to heat the salt solution and to furnish power for the pumping system is only about one-third of the steam required in previously known commercially used processes. Third: As the salt solutions which I employ are capable of dissolving more gas than an equal amount of water will dissolve at the same temperature, my apparatus is much smaller than the apparatus used in other processes and requires less floor space in addition to being less expensive to construct. Fourth: Corrosion of the parts of the apparatus due to the use of sulfuric acid as a drying agent is largely eliminated in my process due to the fact that the gas is dried by liquefied gas instead of by sulfuric acid or similar corrosive material.

While I have described in detail the liquefaction of sulfur dioxid, it is to be understood that my invention is not limited to the treatment of such gas. For example, carbon dioxid, acetylene, hydrogen sulfid, carbon sulfo-oxid, methyl chloride, methyl ether, and other gases capable of being liquefied may be treated according to my process. However, I prefer to employ my process in liquefying gases capable of forming salts with metallic bases, such as acid or oxid gases and the like.

Moreover, I may employ other solvents than those referred to above. For example, when treating carbon dioxid to liquefy it I prefer to employ a solution of an alkali metal carbonate such as sodium or potassium carbonate as a solvent for the carbon dioxid.

By the term "drying" as I have used it in the subjoined claims I mean freeing the gas from volatile portions of the solvent used, whether the solvent be water or other volatile solvent.

While I have described in detail the preferred practice of my process and the preferred form of apparatus by which it is to be carried out, it is to be understood that the details of procedure, the arrangement of steps, and the solvent solutions employed in the process may be widely varied without departing from the spirit of the invention or the scope of the subjoined claims.

I claim:

1. The process of liquefying a gas, comprising dissolving the gas in a strong solution of salt of an organic acid in which solution the gas is more soluble than in water, heating the salt solution to expel the dissolved gas, drying the expelled gas by contacting it with liquefied gas, and cooling the dried gas.

2. The process of liquefying a gas, comprising dissolving the gas in a concentrated solution of salt of an organic acid in which solution the gas is more soluble than in water, heating the salt solution under pressure to expel the gas, drying the gas by contacting it with liquefied gas, and cooling the dried gas.

3. The process of liquefying sulfur dioxid, comprising dissolving gaseous sulfur dioxid in a concentrated solution of a salt of an organic acid in which solution the gas is more soluble than in water, heating the salt solution under pressure to expel the gas, drying the gas by contacting it with liquefied sulfur dioxid, and cooling the dried gas.

4. The process of liquefying sulfur dioxid gas, comprising dissolving the gas in a potassium sulfocyanide solution, heating the solution under pressure to expel the gas, contacting the gas with liquefied sulfur dioxid to dry the gas, and cooling the dried sulfur dioxid gas.

5. The process of liquefying a gas comprising dissolving the gas in a concentrated solution of a salt of an organic acid in which solution the gas is more soluble than in water, heating the salt solution to expel the gas, drying the gas by contacting it with liquefied gas, cooling the dried gas, and transferring heat from the degasified salt solution to the salt solution containing the gas dissolved therein.

6. The process of liquefying a gas comprising dissolving the gas in a concentrated solution of a salt of an organic acid in which solution the gas is more soluble than in water, heating the salt solution under pressure to expel the gas, drying the gas by contacting it with liquefied gas, cooling the dried gas, and transferring heat from the degasified salt solution to the salt solution containing the gas dissolved therein.

7. The process of liquefying an oxid gas which comprises effecting a solution of such gas in an organic acid salt solution in which the gas is more soluble than in water, expelling the gas from such solution, contacting such expelled gas with a body of such oxid gas in liquefied form, and liquefying the dried gas.

8. The process of liquefying an oxid gas which comprises effecting a solution of such gas in a concentrated solution of a salt of an organic acid in which solution the gas is more soluble than in water, expelling the gas from such solution, contacting such expelled gas with a body of such oxid gas in liquefied form, and liquefying the dried gas.

9. The process of liquefying an oxid gas which comprises effecting a solution of such gas in an approximately saturated organic acid salt solution in which the gas is more soluble than in water, expelling the gas from such solution, contacting such expelled gas with a body of such oxid gas in liquefied form, and liquefying the dried gas.

10. A process of treating gases comprising dissolving the gas to be treated in a concentrated solution of a salt capable of holding in solution substantially more of said gas than an equal amount of water will dissolve at the same temperature, heating said salt solution to expel said gas therefrom, drying said gas by contacting it with a body of liquefied gas, and cooling the dried gas.

11. A process of treating gases comprising dissolving the gas to be treated in a solution of a salt, a concentrated solution of which is capable of dissolving substantially more of said gas than an equal amount of water will dissolve at the same temperature, preheating the resulting solution, distilling said solution to degasify the same, treating the distillate to separate the gas from any of the solvent solution distilled therewith, and transferring heat from the degasified solution remaining after said distillation to additional amounts of the solvent solution having gas to be treated dissolved therein to preheat such solution in the further practice of the process.

12. A process of treating gases comprising dissolving an oxid gas in a solution of an organic salt, preheating the resulting solution, heating said solution to degasify the same, cooling the product to separate the oxid gas from any of the salt solution remaining therewith, and transferring heat from the degasified salt solution to additional amounts of the salt solution having an oxid gas dissolved therein to preheat such solution in the further practice of the process.

13. A process of treating gases comprising dissolving sulfur dioxid in a potassium sulfo-cyanide solution, preheating the resulting solution, heating said solution to degasify the same, cooling the product to separate the sulfur dioxid from any of the salt solution remaining therewith, and transferring heat from the degasified solution remaining after said heating to additional amounts of the potassium sulfo-cyanide solution having sulfur dioxid dissolved therein to preheat such solution in the further practice of the process.

14. The process of separating sulfur dioxid gas from its admixture with other gases by contacting the mixture with a potassium sulfo-cyanide solution and heating the solution to expel the dissolved sulfur dioxid.

15. The process of liquefying a gas comprising dissolving the gas in a concentrated solution of a salt of an organic acid in which solution the gas is more soluble than in water, heating the salt solution under pressure to expel the gas, condensing a part of the gas to liquid form by cooling under pressure, drying the remainder of the gas by contacting it with liquefied gas, and condensing the gas to liquid form by cooling it under pressure.

16. The process of liquefying a gas comprising dissolving the gas in a concentrated solution of a salt of an organic acid in which solution the gas is more soluble than in water, heating the salt solution under pressure to expel the gas, condensing a portion of the gas to liquid form by cooling under pressure, drying additional amounts of the expelled gas by contacting the same with said liquefied gas, and condensing the dried gas to liquid form by cooling it under pressure.

17. The process of liquefying sulfur dioxid comprising dissolving gaseous sulfur dioxid in a concentrated solution of a salt of an organic acid in which solution the sulfur dioxid is more soluble than in water, heating the salt solution under pressure to expel the sulfur dioxid therefrom, condensing a portion of the sulfur dioxid to liquid form by cooling under pressure, drying additional amounts of expelled sulfur dioxid gas by contacting the same with said liquefied sulfur dioxid, and condensing the dried sulfur dioxid to liquid form by cooling it under pressure.

RALPH H. McKEE.